ALPHA-NUMERICAL DISPLAY MEANS

Filed Nov. 9, 1959 2 Sheets-Sheet 1

NORMAN J. APPLETON
INVENTOR.

BY Andrew L. Bain
George J. Seligsohn

ATTORNEYS

Feb. 6, 1962 N. J. APPLETON 3,020,531
ALPHA-NUMERICAL DISPLAY MEANS
Filed Nov. 9, 1959 2 Sheets-Sheet 2
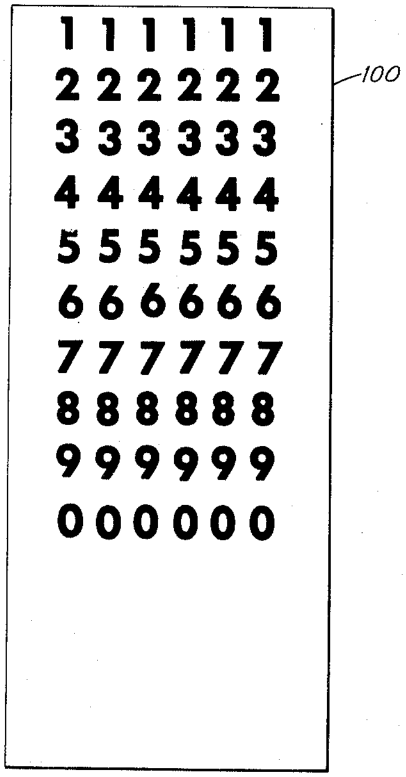
Fig. 2a
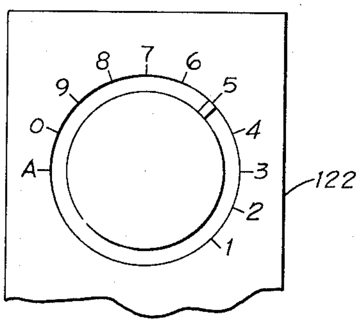
Fig. 3
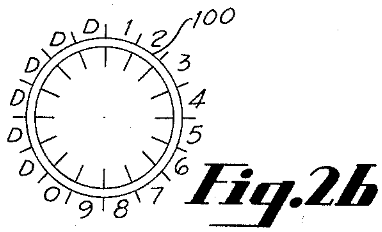
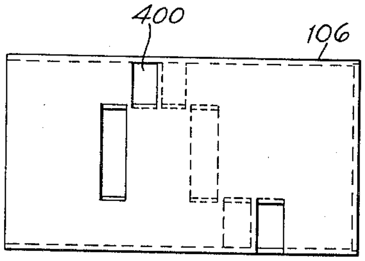
Fig. 4a
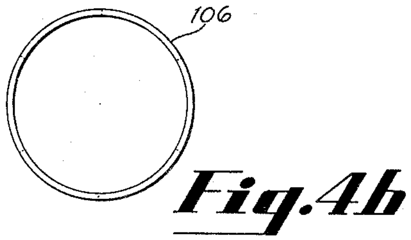
NORMAN J. APPLETON
INVENTOR.
BY Andrew L. Bain
George J. Seligsohn
ATTORNEYS United States Patent Office 3,020,531
Patented Feb. 6, 1962

3,020,531

ALPHA-NUMERICAL DISPLAY MEANS

Norman J. Appleton, Plainview, N.Y., assignor to General Precision, Inc., a corporation of Delaware Filed Nov. 9, 1959, Ser. No. 851,872
3 Claims. (Cl. 340—324)

This invention relates to alpha-numeric visual display means, and, more particularly, to stroboscopic means for visually displaying a plurality of characters in accordance with discrete character-manifesting signals.

The discrete character-manifesting signals may represent the stored output of a digital computer, for instance. In this case, the information manifested by the character manifesting signals will usually be in some sort of binary code, such as true binary, decimal binary, etc. However, some other code, such as two out of five, two or three out of four, etc., may also be used. In any case, the present invention provides means responsive to coded information for visually displaying this information.

In its broadest terms, the present invention comprises scanning means for bringing each of a plurality of characters within a viewing area a character at a time, and synchronizing means for effecting the operation of normally unoperated display means only when that character which is manifested by an applied character-manifesting signal is within the viewing area.

More specifically, the scanning means may be operated cyclically at a high rate of speed so that a character manifested by an applied character-manifesting signal is repeatedly brought within the viewing area. In this case, due to the persistence of vision, a character which is actually being displayed intermittently, will appear to an observer to be continuously displayed.

Furthermore, each cycle of the scanning means may be time shared between several separate applied character-manifesting signals. In this case, the synchronizing means controls a switch which sequentially applies each separate character-manifesting signal for a given interval of each cycle.

The relative location of the viewing area is displaced for each of the separate character-manifesting signals, so that each of the respective characters manifested by the separate signals appears in a separate distinct position.

The embodiment of the invention may take many different forms. For instance, the characters may be located on a rotating member positioned behind an optical lens system for focusing each character, as it passes a given position, on the back of a normally cut-off light amplifier screen. Logic means responsive to the code of a character-manifesting signal applied thereto and a synchronizing signal manifesting the angular position of the member can be provided to render the light amplifier operated in response to the character manifested by the applied signal being focused on the screen. Furthermore, the applied signal may be switched and the optical lens system tilted at intervals by a synchronizing signal to displace the position on the screen at which characters are focused.

However, a much simpler system for accomplishing the principles of the present invention, which is considered to be a preferred embodiment of the invention, consists of a given number of axially displaced columns of characters circumferentially disposed on a rotating drum. Surrounding the drum is a shutter member which is rotated at $1/n$ the speed of the drum, where $n$ is an integer equal to the given number of axially displaced columns. The shutter is provided with $n$ angularly displaced slots each of which is in cooperative relationship with a different column. Both the drum and shutter member are located within a housing having a window parallel to the axis of the drum. The window and slots, which cooperate to form the viewing area, have widths such that only one character may be viewed at anytime. A flash tube is flashed when the character then within the viewing area is manifested by an applied character-manifesting signal.

It is therefore an object of this invention to provide an improved alpha-numeric visual display device.

It is a further object of this invention to provide a stroboscopic alpha-numeric visual display device.

It is a still further object of this inveniton to provide a stroboscopic alpha-numeric visual display device responsive to a plurality of independent character-manifesting signals on a time sharing basis.

These and other objects, features and advantages of the present invention will become more apparent from the following detailed description taken together with the accompanying drawing, in which:

FIGURES 2A and 2B show, respectively, an unrolled and end view of the character drum, FIGURE 3 shows the arrangement of pickups on the pickup means, and FIGURES 4A and 4B show, respectively, a front and end view of the shutter drum.

Figure 1:
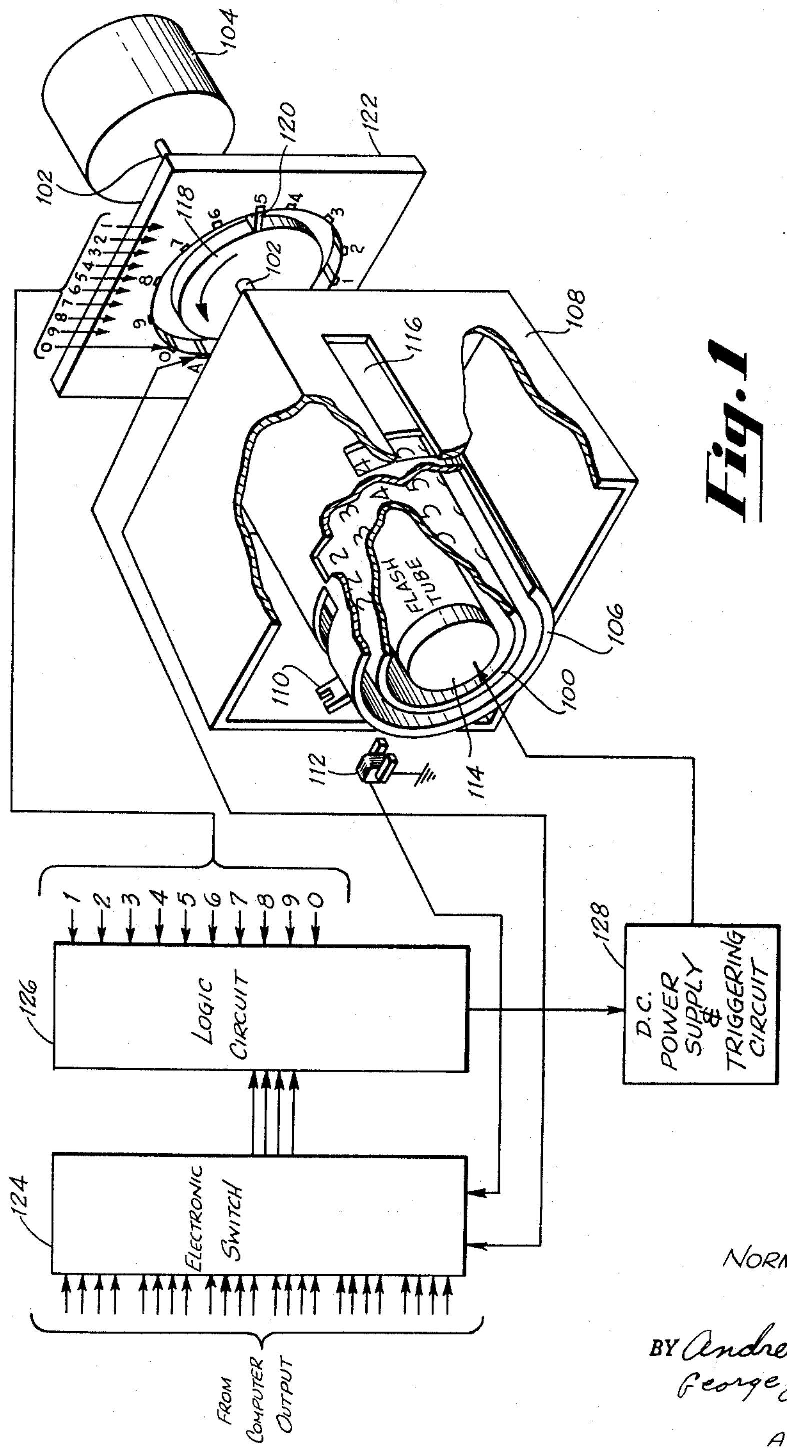
FIGURE 1 shows a preferred embodiment of the invention.

Referring to FIGURE 1, there is shown character drum 100. From FIGURES 2A and 2B it can be seen that character drum 100 has 6 axially displaced columns of digits thereon. Each of the columns includes the digits 1, 2, 3, 4, 5, 6, 7, 8, 9 and 0 circumferentially disposed about the drum with a spacing of 22½° between successive digits to provide a total spacing of 202½° between 1 and 0. The remaining 157½° comprises a dwell space. Character drum 100 is opaque and the digits are openings which are cut out therefrom.

Character drum 100 is attached to drive shaft 102 which is driven by drive motor 104.

Surrounding character drum 100 is shutter drum 106 which is coupled to shaft 102 through gearing (not shown) to rotate shutter drum 106 at ⅙ the angular velocity of character drum 100. This gearing may comprise an internal gear fixed to shutter drum 106, a drive gear fixed to shaft 102, and an idler gear therebetween which is secured to housing 108.

As shown in FIGURES 4A and 4B, shutter drum 106 has 6 circumferential slots 400 therein. Each of the slots is in cooperative relationship with a separate column of digits. Each of the slots 400 is 60° in circumferential extent, adjacent slots being displaced from each other by 60°.

Attached to the outer surface of shutter drum 106 is permanent magnet 110 which cooperates with fixed pickup coil 112.

Within character drum 100, fixed to housing 108, is flash tube 114.

The entire assembly of flash tube 114, character drum 100 and shutter drum 106 are enclosed by housing 108. Housing 108 includes a viewing window 116 which cooperates with slots 400 of shutter drum 106 to provide a viewing area which permits only a single character to be viewed at a time.

Also attached to shaft 102 is a synchronizing disc 118 having fixed thereto permanent magnet 120. In cooperative relationship with permanent magnet 120 are fixed pickups 1, 2, 3, 4, 5, 6, 7, 8, 9, 0 and A mounted on member 122. As shown in FIGURE 3, the spacing between these pickups is 22½°. Permanent magnet 120 is oriented to pass any given digit pickup when the corresponding digit on character drum 100 is within window 116. After passing pickup zero, permanent magnet passes pickup A, and then goes through a dwell space of 135° before coming around again to pickup 1.

Electronic switch 124 is effectively a four pole six throw switch capable of a high switching rate. A six digit number in binary decimal from (that is each of the six digits is separately expressed in binary form) is applied as an input to electronic switch 124 from means such as the output of a computer.

The output from electronic switch 124, which is a selected one of the six digits, is applied as a first input to logic circuit 126. The outputs from pickups 1, 2, 3, 4, 5, 6, 7, 8, 9 and 0 are applied as a second input to logic circuit 126. Logic circuit 126 may be a diode matrix for comparing the first and second inputs thereto, and providing an output only when the digit manifested by the second input applied thereto corresponds to the digit manifested by the character-manifesting signal applied as a first input thereto.

The output from logic circuit 126 is applied as an input to D.C. power supply and triggering circuit to effect the firing of a thyratron therein to produce a high voltage pulse in response thereto, which is applied to flash tube 114.

The output from pickup A is applied to electronic switch 124 to effect the switching thereof. The output of pickup 112 is applied to electronic switch 124 to effect the resetting thereof.

Considering now the operation of the device, drive motor operates at a relatively high speed, such as 6,000 r.p.m., causing character drum 100 and permanent magnet 120 to rotate in synchronism at this speed. Shutter drum 106 makes one revolution for every six revolutions of character drum 100, so that a different one of slots 400 of shutter drum 106 is located between character drum 100 and window opening 116 during each of the six revolutions of character drum 100. This results in the digits of each column being sequentially brought within the viewing area in succession.

During each revolution of permanent magnet 120, when permanent magnet 120 passes by pickup A, an induced pulse is applied to electronic switch 124 to effect the switching thereof, so that each of the six character-manifesting signals is applied in succession as the first input to logic circuit 126 for an interval equal to one revolution of character drum 100. After six revolutions permanent magnet 110 passes by pickup 112 and an induced pulse therefrom is applied to electronic switch 124 to effect the resetting thereof, whereupon the cycle is repeated.

The dwell space of 135° between the time that permanent magnet 120 passes pickup A and passes pickup 1 is sufficient to permit electronic switch 124 to complete its switching function.

As permanent magnet 120 successfully passes each of pickups, 1, 2, 3, 4, 5, 6, 7, 8, 9 and 0, an induced pulse is sequentially applied to each of the corresponding second inputs to logic circuit 126. If at this time the digit manifested by the character-manifesting signal is 5, for instance, there will be electrical markings on the first and third conductors of the first input to logic circuit 126, and no electrical markings on the second and fourth conductors (5 is equal to $2^2+2^0$ in binary form). With these electrical markings on the first input to logic circuit 126, logic circuit 126 will provide an output pulse only in response to an input pulse corresponding to 5 being applied as the second input to logic circuit 126. In response to this output pulse from logic circuit, a high voltage pulse is applied from D.C. power supply and triggering circuit 128 to flash tube 114, causing flash tube 114 to flash. Since permanent magnet 120 and character drum 100 are rotated in synchronism, this will occur when the digit 5 is within the viewing area.

If drive motor is operated at 6,000 r.p.m., shutter drum 106 will rotate at 1,000 r.p.m., and each character will be repeatedly scanned at 1,000 r.p.m. which is equal to 16⅔ times per second. This, due to the persistence of vision, is fast enough to provide an apparent continuous display to an observer.

It will be seen that the characters on character drum 100 may be letters or other symbols, rather than digits.

Although only a preferred embodiment of the invention has been described in detail herein, it is not intended that the invention be restricted thereto, but that it be limited only by the true spirit and scope of the appended claims.

I claim:

1. An alpha-numeric display device for displaying characters in accordance with discrete character-manifesting signals applied thereto, said device comprising:
   a first drum having $n$ axially displaced columns of characters circumferentially disposed thereon, where $n$ is an integer greater than one;
   cyclically operated scanning means in cooperative relationship with said first drum for sequentially scanning said characters a character at a time; a second drum, coaxial with and surrounding said first drum having $n$ similar circumferentially staggered, equiangularly center-displaced non-overlapping slots therein, each of said slots being in cooperative relationship with a separate one of said columns of said characters; first rotating means for rotating said first drum; second rotating means for rotating said second drum at an angular velocity equal to $1/mn$ of said first drum, where $m$ is any positive integer, said second drum being moved through the angular displacement between said slot centers in response to said first drum making an integral number of revolutions; a window oriented in cooperative relationship with said drums, said window having one dimension parallel to the axis of said drums at least equal to the axial extent of said $n$ columns and a second dimension perpendicular to said one dimension having an extent which permits only a single character to be observed; normally unoperated illuminating display means for illuminating and displaying the character which is then within both one of said slots and said window in response to the operation thereof;
   logic means associated with said scanning means and having a character manifesting signal applied thereto for effecting the operating of said display means in response to the discrete character manifested by said signal being scanned; and,
   switching means controlled by said scanning means for sequentially applying for an interval, each one, of a given number, of separate character-manifesting signals to said logic means.

2. A device as claimed in claim 1, said illuminating display means being disposed longitudinally in said first drum and having one dimension parallel to the axis of said drums, and about equal in length to said window.

3. A device as claimed in claim 2, said illuminating display means being disposed coaxially with said drums.

References Cited in the file of this patent

UNITED STATES PATENTS

| | | |
|---|---|---|
| 2,431,591 | Snyder et al. | Nov. 25, 1947 |
| 2,905,897 | Giel | Sept. 22, 1959 |